(12) United States Patent
Morgan (10) Patent No.: US 7,841,605 B1
(45) Date of Patent: Nov. 30, 2010

(54) VEHICLE STEERING CENTERING DEVICE

(76) Inventor: Terry L. Morgan, 1063 Cap Rock Hill, New Braunfels, TX (US) 78132

( * ) Notice: Subject to any disclaimer, the term of this patent is extended or adjusted under 35 U.S.C. 154(b) by 213 days.

(21) Appl. No.: 12/080,831

(22) Filed: Apr. 4, 2008

Related U.S. Application Data (60) Provisional application No. 60/922,980, filed on Apr. 12, 2007.

(51) Int. Cl.
 *B62D 7/22* (2006.01)
(52) U.S. Cl. .................................. 280/89.11
(58) Field of Classification Search ............. 280/89.11, 280/89.12, 89.1, 93.502
See application file for complete search history.

(56) References Cited

U.S. PATENT DOCUMENTS

| | | | | |
|---|---|---|---|---|
| 4,410,193 A | | 10/1983 | Howard | |
| 4,418,931 A | * | 12/1983 | Howard | .................... 280/89.11 |
| 5,527,053 A | * | 6/1996 | Howard | ....................... 280/90 |
| 5,816,594 A | | 10/1998 | Howard | |
| 6,003,887 A | | 12/1999 | Howard | |
| 6,520,520 B2 | | 2/2003 | Howard | |
| 7,118,118 B1 | * | 10/2006 | Howard | .................... 280/89.11 |

* cited by examiner

*Primary Examiner*—Faye M. Fleming
(74) *Attorney, Agent, or Firm*—Harpman & Harpman (57) ABSTRACT

A steering centering device for vehicles to import straight line stability without excess induced resistance during use. The device includes a pair of spring urged roller bearing assemblies connected to the vehicle steering assembly for select movement along respective contoured cam travel surfaces. Resistance is imparted to the centering assembly as the roller bearings move from a rest (centered notch position) by steering input. A trim adjustment is provided to adjustably reposition the roller bearings rest position and a pressure damper is alternately positioned between the roller bearings to increase turning resistance.

3 Claims, 9 Drawing Sheets

VEHICLE STEERING CENTERING DEVICE

This application claims benefit of U.S. Provisional Patent Application Ser. No. 60/922,980, filed Apr. 12, 2007.

BACKGROUND OF THE INVENTION

1. Technical Field

This invention relates to vehicle steering systems and more specifically to centering devices associated therewith that maintain a center steering position regardless of minor non-linear inputs caused by variable factors such as cross winds or driver induced over corrections.

2. Description of Prior Art

Prior art devices of this type have relied on a variety of air/hydraulic centering systems that use pressure resistance of a fluid into an accumulator or piston to compress fluid in a cylinder which induces higher pressure the further wheel is turned off center, see for example U.S. Pat. Nos. 4,410,913, 5,816,594, 6,520,520 and 6,003,887.

SUMMARY OF THE INVENTION

A spring urged centering device for steering assemblies of vehicles to maintain a stable "center" position of the steerable wheels on a vehicle. By "centering" the steering of the vehicle a number of driving issues are addressed such as road wander, and compensated steering correction requirement due to environmental inputs.

DETAILED DESCRIPTION OF THE INVENTION

Figure 1:
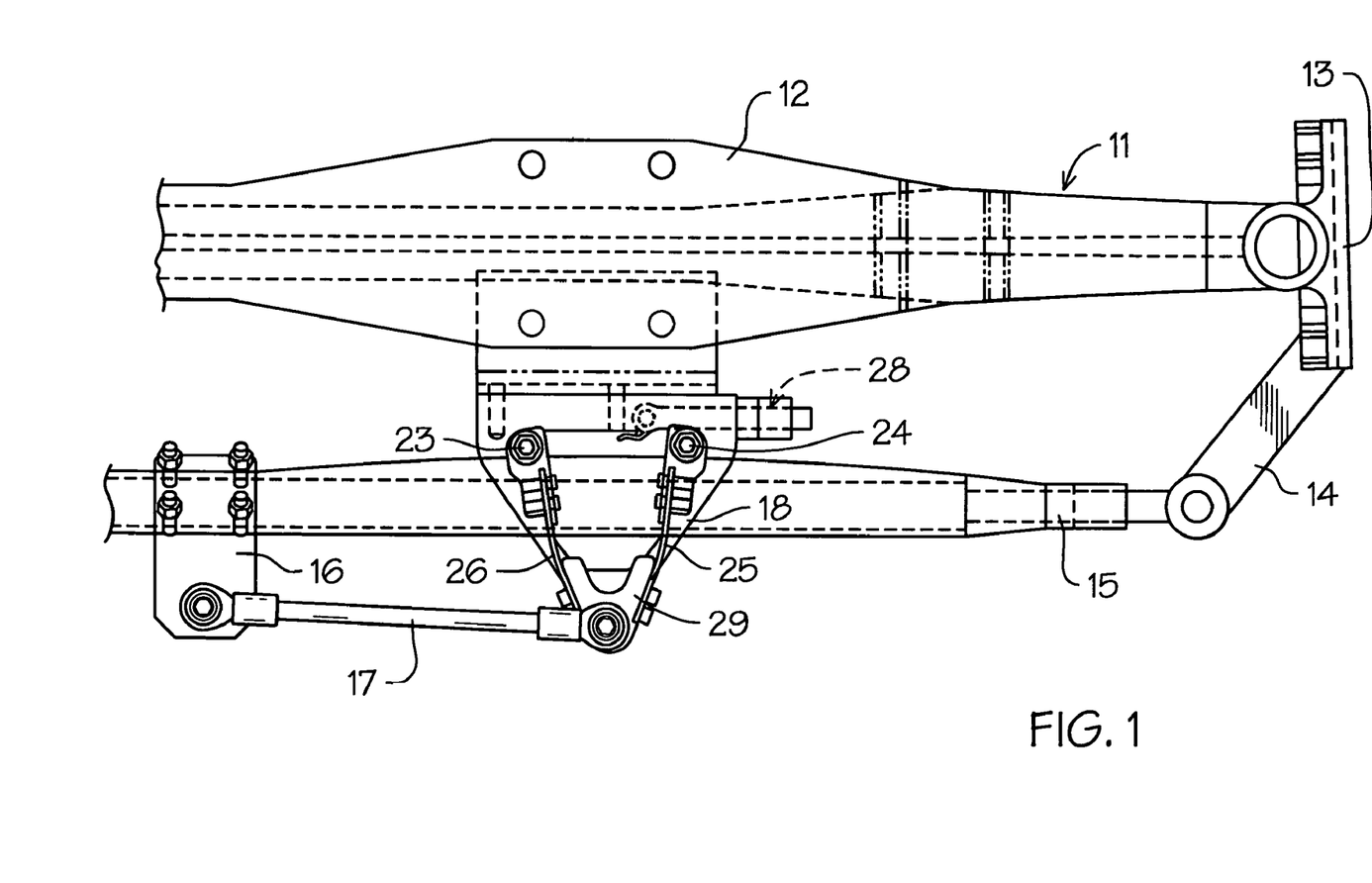
FIG. 1 is a partial top plan view of the centering device mounted on a vehicle steering assembly.
Figure 2:
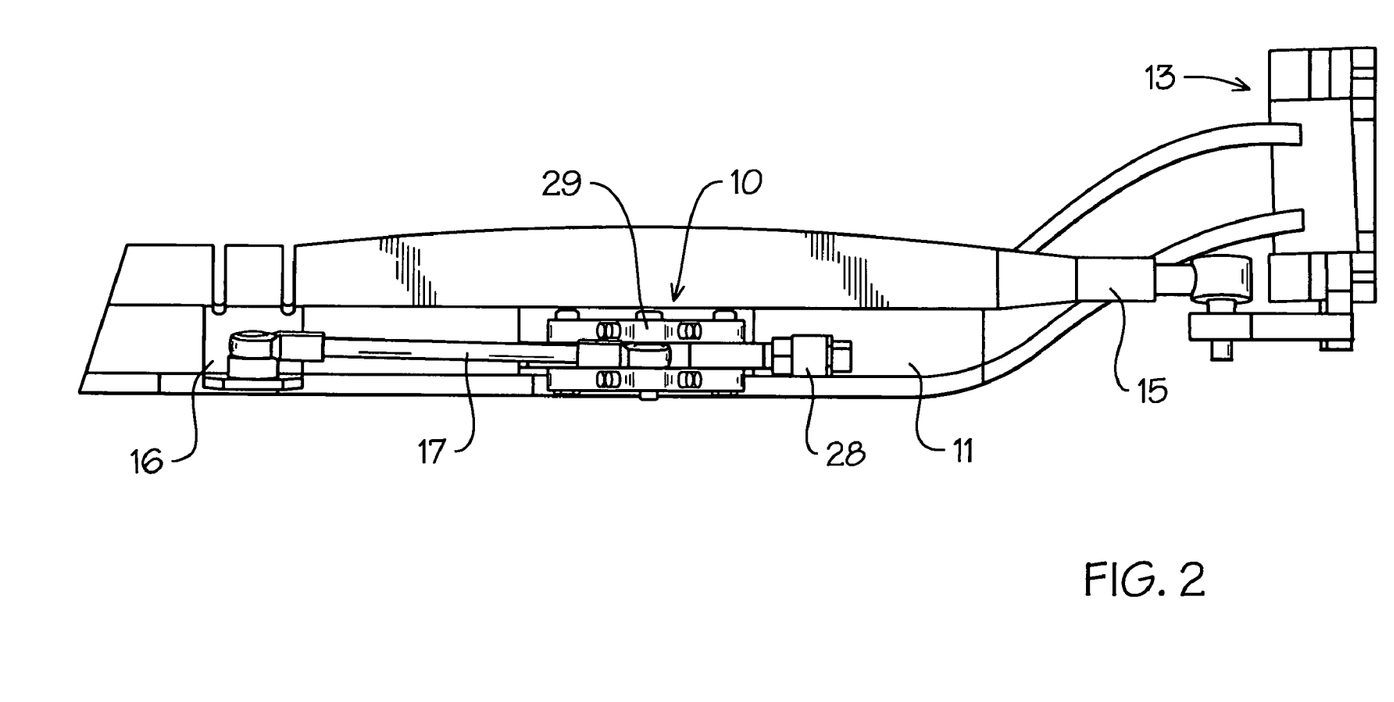
FIG. 2 is a front elevational view thereof.

Referring to FIGS. 1 and 2 of the drawings, a centering device 10 of the invention can be seen mounted on a vehicle steering assembly 11. The steering assembly 11 has a main axle 12, and a wheel 13 pivotally secured thereto with steering linkage 14 extending therefrom to a tie rod 15. A link mounting bracket 16 secured to the tie rod 15 has a pivoted connection linkage 17 to the centering device 10 of the invention which is mounted to the main axle 12.

Figure 3:
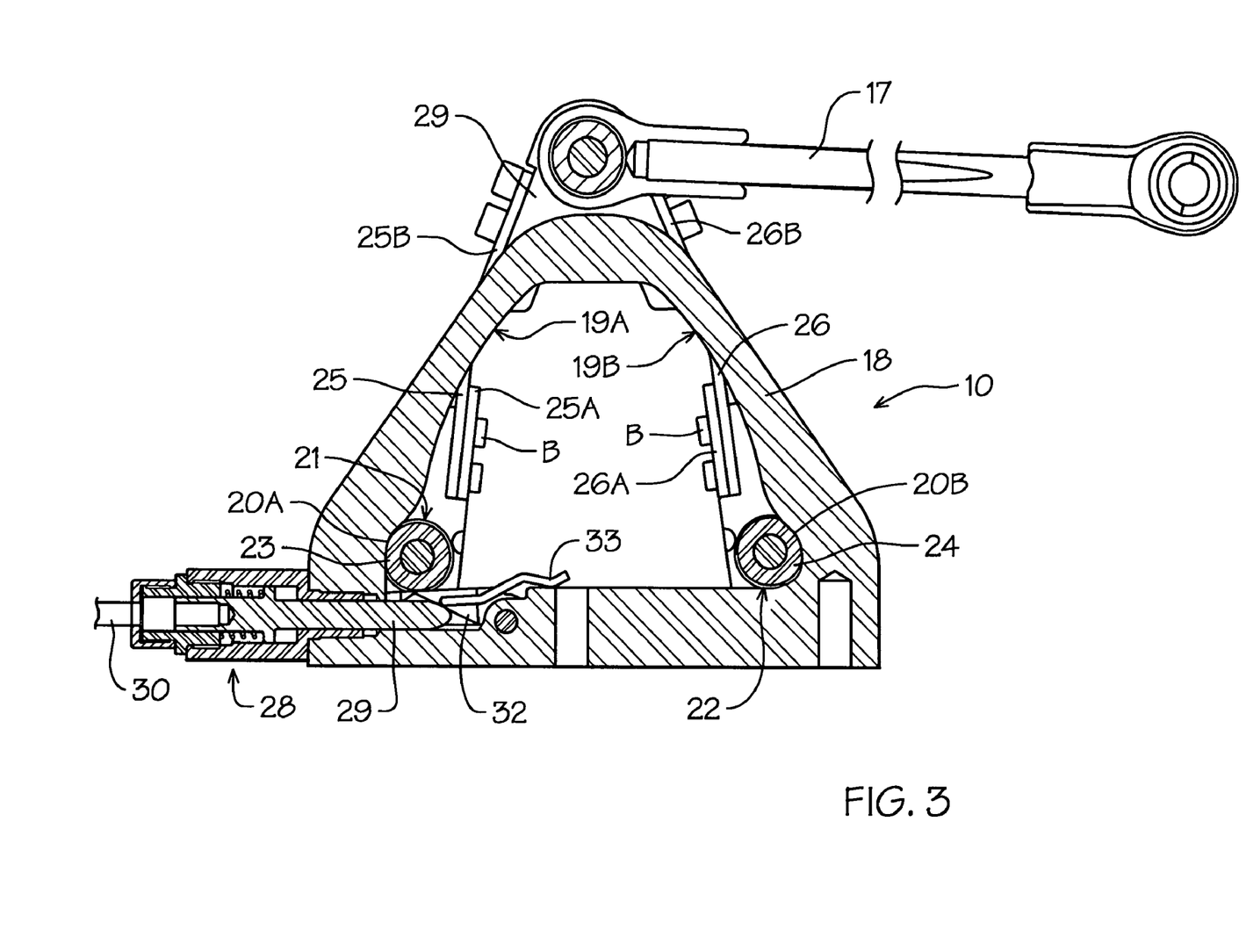
FIG. 3 is an enlarged partial sectional view of the centering device on lines 3-3 of FIG. 5.

The centering device 10 as best seen in FIG. 3 of the drawings has a main bifurcated bracket member 18 defining opposing travel engagement cam surfaces 19A and 19B on its inner respective surfaces. Center notches 20A and 20B are formed within the respective cam surfaces for registration of roller bearing assemblies 21 and 22 therewithin. The roller bearing assemblies 21 and 22 have respective roller bearings 23 and 24 mounted on trail blocks from which extends identical flat resistance leaf springs 25 and 26 with corresponding retainer plates 25A, 26A and bolts B. A head block 29 is the terminal securing point for the respective oppositely disposed spring ends 25B and 26B and in turn is pivotally connected to the connecting linkage 17 hereinbefore described.

Figure 4:
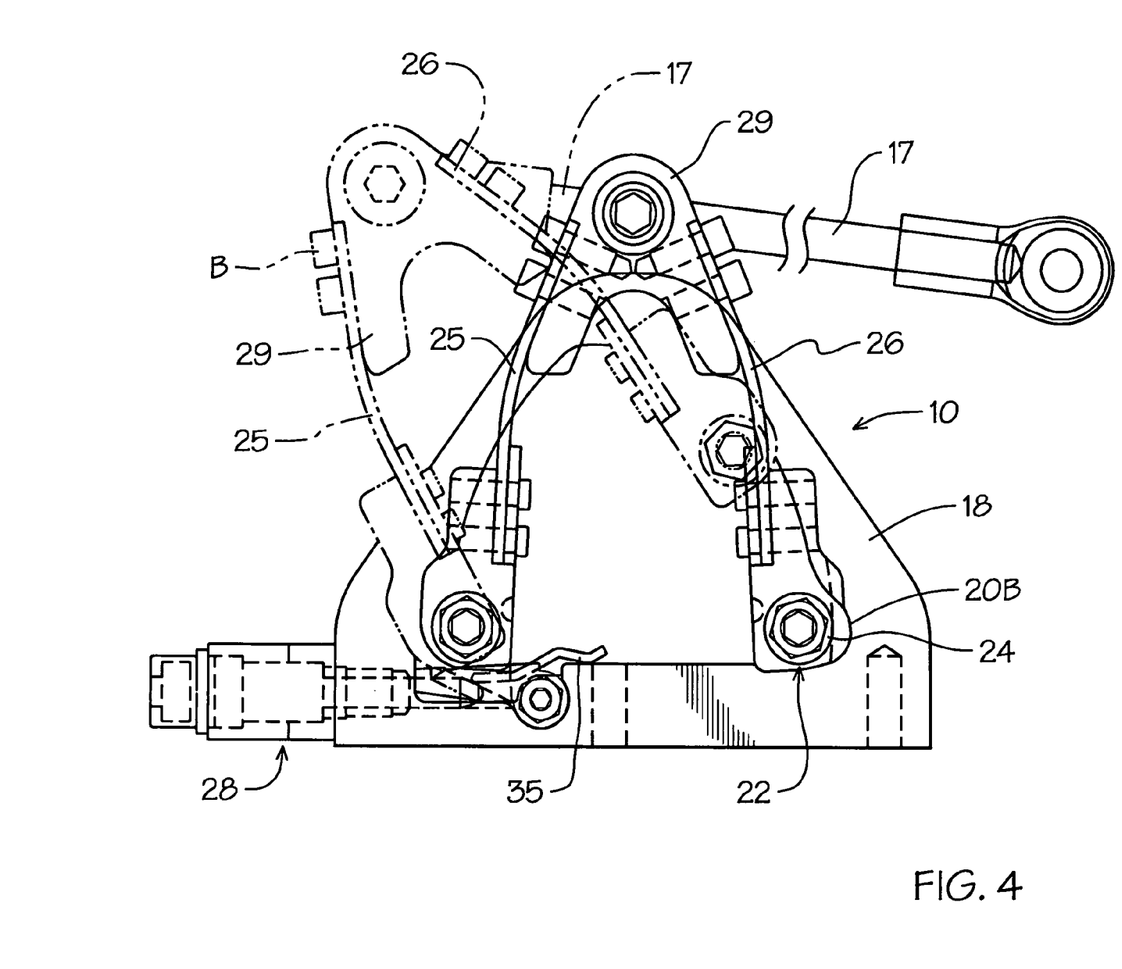
FIG. 4 is a top plan view of the centering device in straight ahead position and broken lines in off center turned position.
Figure 5:
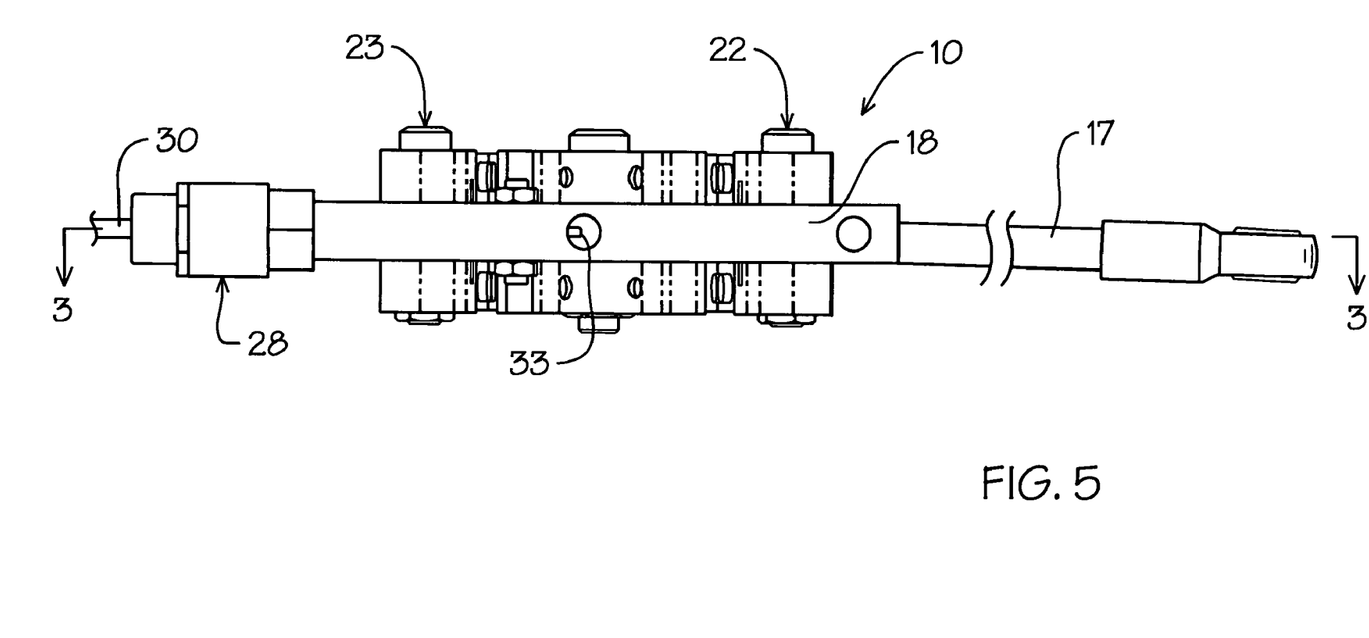
FIG. 5 is a front elevational view thereof.

It will be evident from the above description that bi-directional longitudinal input from the tie rod 15 will be transferred via the connecting linkage 17 to the corresponding spring mounted roller bearings 23 and 24 which in turn are pulled out of the respective centering notches 20A and 20B positions along the corresponding cam engagement surfaces 19A and 19B as best seen in FIG. 4 of the drawings in solid and broken lines. As noted, it is the spring resistance of the respective leaf springs 25 and 26 that maintains the roller bearings 23 and 24 in their respective centering notches 20A and 20B and which is overcome during turning action of the steering assembly.

Figure 9:
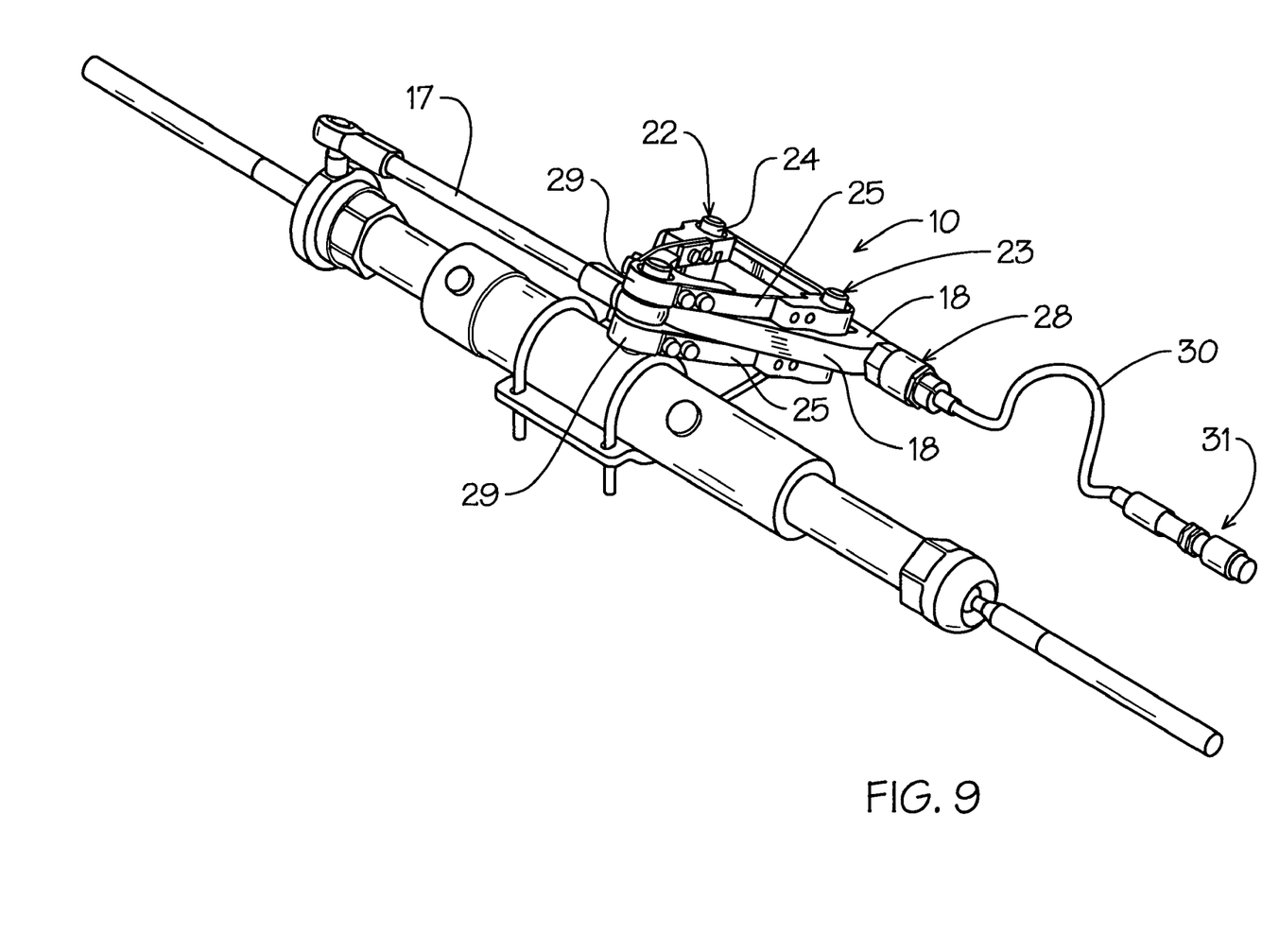
FIG. 9 is a perspective view of the centering device mounted on an alternate rack and pinion visual steering assembly.

An adjustable bearing trim assembly 28 is provided for engagement with the roller bearing 23 as best seen in FIG. 3 of the drawings. The adjustable bearing trim assembly 28 has a spring loaded trim pin 29 slidably positioned in a mounting sleeve 29A. A pull cable 30 extends from the trim pin 29 to an adjustable trim pin lock assembly 31 that allows remote adjustable input to the trim assembly 28 as seen in FIG. 9 of the drawings on a rack and pinion assembly RP 32. Referring back to FIG. 3 of the drawings, pivoted tapered ramp element 32 is incrementally engaged by the advancing trim pin 29 repositioning the roller bearing 23 by engagement therewith in the centering notch 20A which is defined by the ramp element 32 and cam surface 19A as hereinbefore described. A lever spring 33 engages the ramp element 32 maintaining resilient contact with the trim pin 29.

Figure 6:
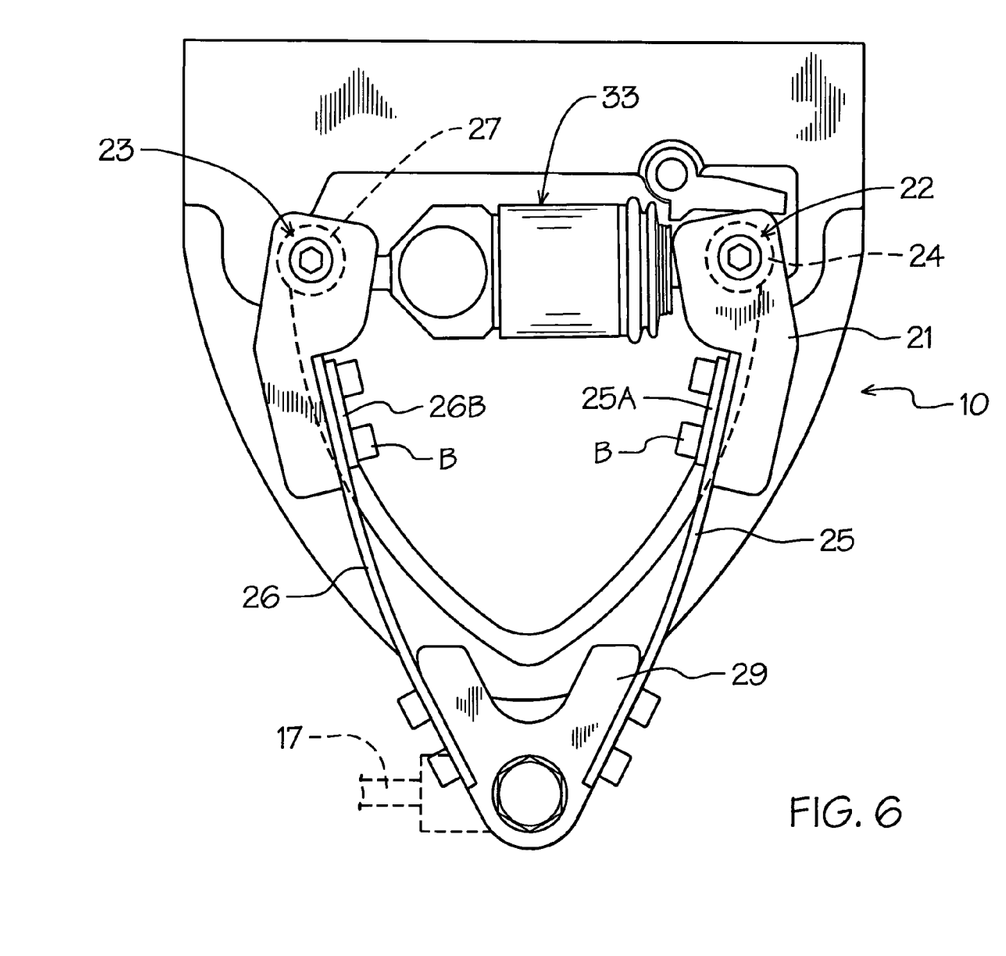
FIG. 6 is a top plan view of the centering device with an alternate dampener of the invention positioned therein.
Figure 7:
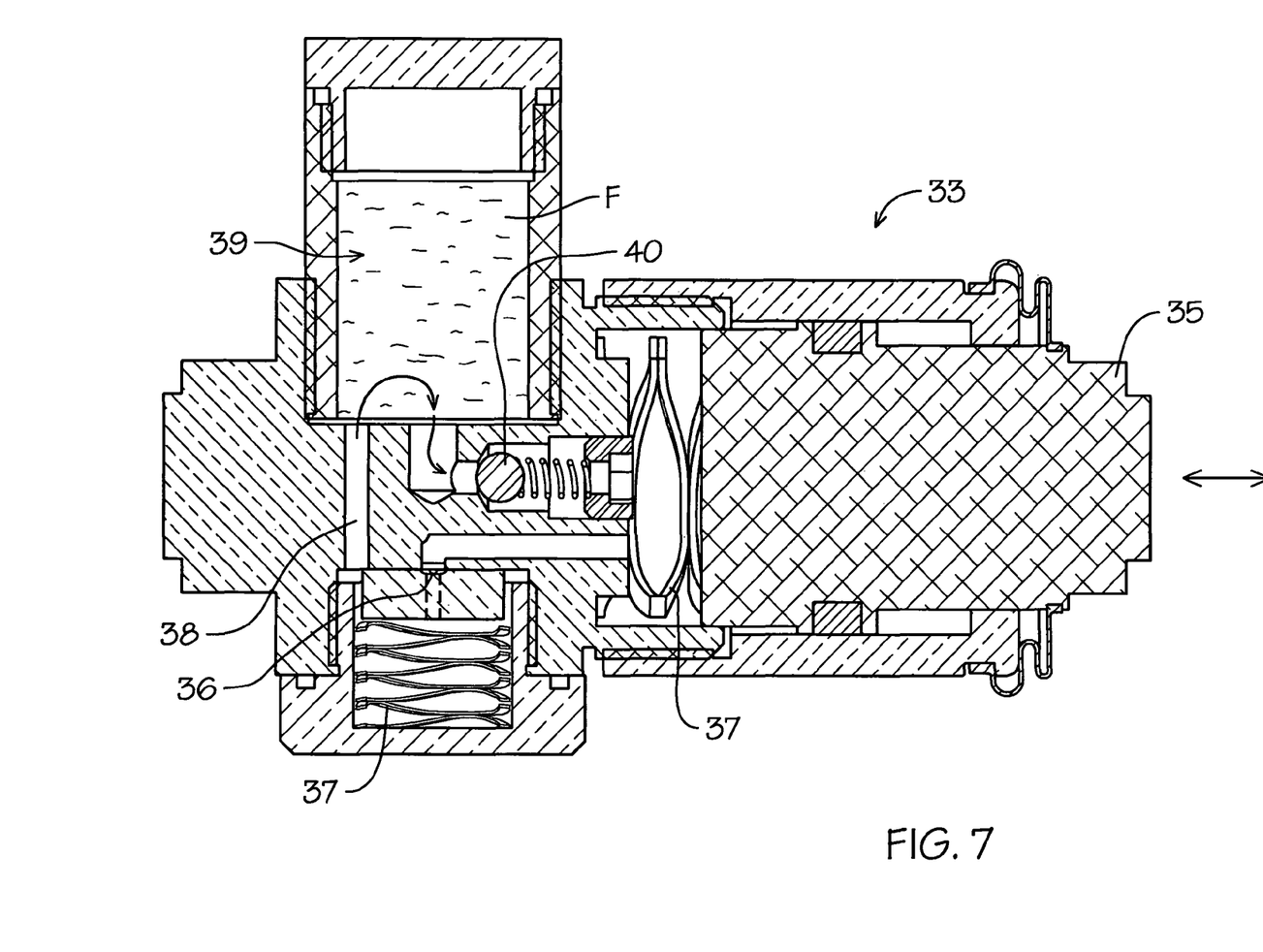
FIG. 7 is a sectional view of the damper.

Referring now to FIGS. 6-9 of the drawings, optional damper assemblies 33 and 34 can be seen which can be inserted between and engaged on the respective roller bearings 23 and 24 as best seen in FIG. 6 of the drawings. The dampers 33 and 34 provide for so called "blow out" protection and increased turning resistance by employment therewithin. Referring to FIG. 7 of the drawings, the damper 33 can be seen in section having a piston 35 in which hydraulic fluid F is forced through a resistance orifice 36 against a resistance spring 37. A return channel 38 is provided to a hydraulic reservoir 39 in communication with a check ball valve 40 as the piston 35 is pushed in as indicated by the directional arrow and the hydraulic fluid F is strained through the resistance orifice 36. As pressure is released, the return spring 37 pushes the piston 35 back out and the hydraulic fluid F is recirculated on the return side as will be well understood by those skilled in the art.

Figure 8:
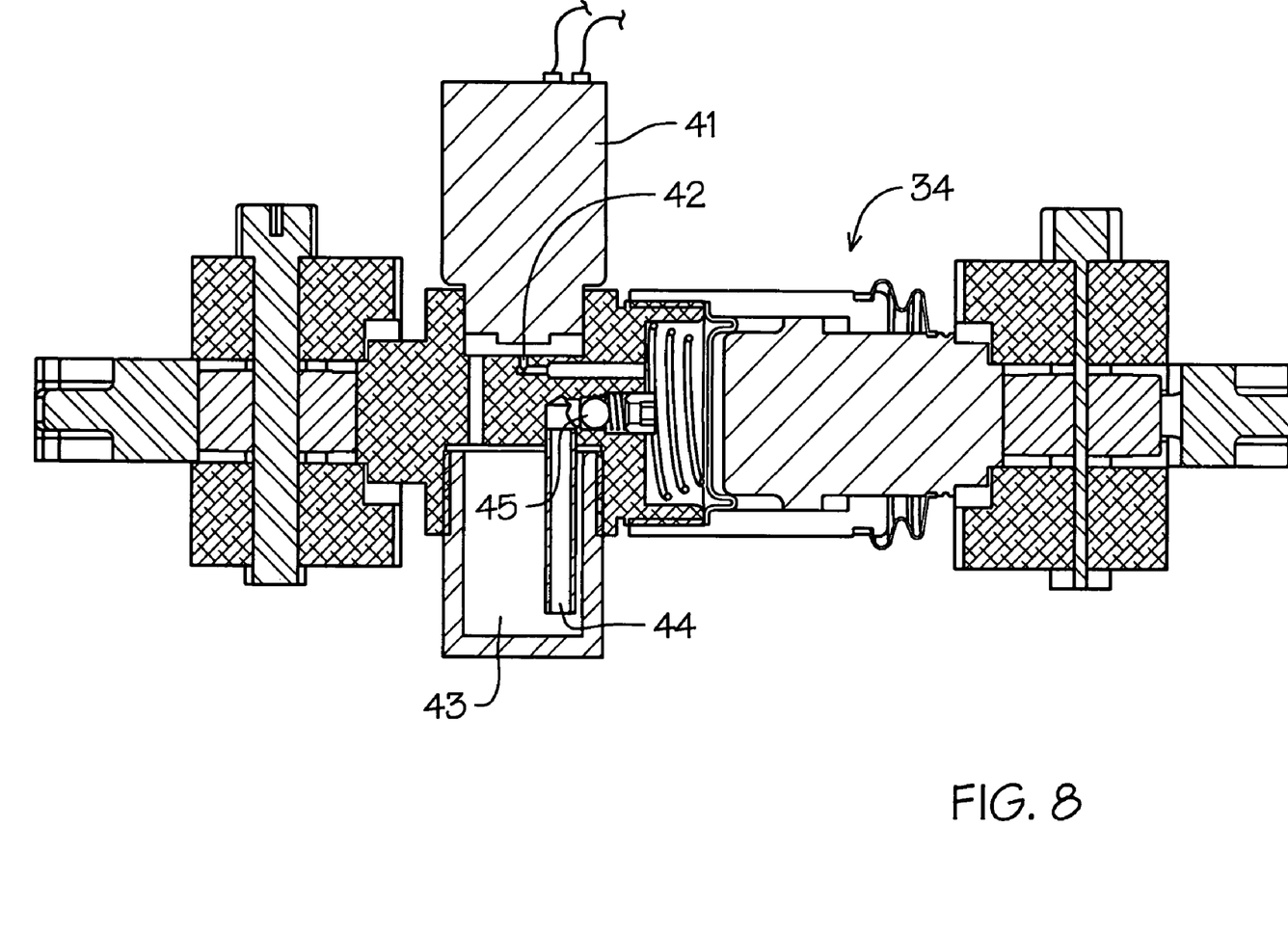
FIG. 8 is a partial sectional view of an alternate damper configuration with a solenoid mounted within the centering device.

The alternate damper assembly 34 as seen in FIG. 8 of the drawings uses an electric solenoid 41 in which an input piston and return spring, understood within the art, with an adjustment resistance orifice 42. The hydraulic reservoir 43 with a sump pick-up 44 and a check ball/spring valve 45 is used in place of the corresponding resistance orifice/spring combination 36 and 37 as previously described.

In both damper configurations, damper pressure will increase in proportion to the valve pressure in response to piston movement imparted by the roller bearings with higher dampening pressure at higher vehicle speeds over 30 pm and lower dampening pressure at lower speeds under 30 pm for variable pressure dampening of the electric solenoid configuration.

It will be evident and apparent to those skilled in the art that the hereinbefore described centering device 10 of the invention will provide a unique and effective driving solution that will reduce driving fatigue, prevent over steering that could lead to car rollovers. The device will eliminate road wander imparted by climatic condition and helps maintain vehicle direction stability during blow outs. It will thus be seen that a new and novel centering device for vehicle steering assemblies utilizing spring resistance as its primary centering capacity element has been illustrated and described and it will be apparent to those skilled in the art that various changes and modifications may be made therein without departing from the spirit of the invention.

Therefore I claim:

1. A vehicle steering centering apparatus for imparting a resistance force resisting steering forces tending to move steerable member to either side of a selected position comprising,     a bifurcated bracket, opposing identical cam surfaces on said bracket, said cam surfaces having a centering notch respectively positioned therein,     a head block pivotally secured to a steering linkage,     leaf springs extending from said head block,     cam follower roller bearings positioned on respective leaf springs,     means for selectively adjusting one of said roller bearings on said cam surface for positioning said steerable member to said selected steered position.

2. The vehicle steering centering apparatus set forth in claim 1 wherein said means for selectively adjusting one of said roller bearings on said cam surface comprises,     a tapered pivoted ramp, a trim pin registerable against said ramp and cable means extending from said trim pin to a remote adjustable activation site.

3. The vehicle steering centering apparatus set forth in claim 1 wherein said centering notches define cam follower bearing alternate pivot points.

* * * * *